United States Patent [19]

Andersson

[11] 4,225,148
[45] Sep. 30, 1980

[54] STEERING SYSTEMS

[75] Inventor: Per U. Andersson, Lidköping, Sweden

[73] Assignee: Aktiebolaget Svenska Kullagerfabriken, Goteborg, Sweden

[21] Appl. No.: 930,756

[22] Filed: Aug. 3, 1978

Related U.S. Application Data

[63] Continuation of Ser. No. 661,812, Feb. 27, 1976, abandoned, which is a continuation-in-part of Ser. No. 634,162, Nov. 20, 1975, which is a continuation of Ser. No. 520,654, Nov. 4, 1974, which is a continuation of Ser. No. 588,357, Jun. 19, 1975, which is a continuation-in-part of Ser. No. 331,188, Feb. 9, 1973, abandoned.

[30] Foreign Application Priority Data

Feb. 10, 1972 [SE] Sweden .................. 1566/72
Mar. 20, 1972 [SE] Sweden .................. 3524/72
Nov. 2, 1973 [NL] Netherlands ............ 7315090

[51] Int. Cl.³ .............................................. B62D 3/02
[52] U.S. Cl. .................................. 280/95 R; 64/2 R; 74/498; 74/501 R; 114/144 R
[58] Field of Search ............... 280/96, 93, 95, 96.1, 280/771; 74/498, 499, 501 R; 180/78; 64/2 R, 2 P; 114/144 R

[56] References Cited

U.S. PATENT DOCUMENTS

| | | | |
|---|---|---|---|
| 1,884,474 | 10/1932 | Wolforth | 280/96 |
| 2,757,014 | 7/1956 | Schmitz | 280/773 |
| 2,945,395 | 7/1960 | Ziskal | 74/498 |
| 3,111,042 | 11/1963 | Hoover | 74/499 |
| 3,216,521 | 11/1965 | Ulrich | 180/78 |
| 3,346,272 | 10/1967 | Smith | 280/668 |
| 3,410,571 | 11/1968 | Bishop | 280/99 |
| 3,605,932 | 9/1971 | Wilfert | 280/96 |
| 3,683,031 | 3/1972 | Elwell | 280/96 |

FOREIGN PATENT DOCUMENTS

| | | | |
|---|---|---|---|
| 626371 | 9/1927 | France | 280/96 |
| 14355 | of 1907 | United Kingdom | 280/96 |
| 715310 | 9/1954 | United Kingdom | 74/498 |

Primary Examiner—John P. Silverstrim
Attorney, Agent, or Firm—Eugene E. Renz, Jr.

[57] ABSTRACT

A steering assembly or system for vehicles such as a car comprises a speed increasing gear for the turning movement of the car steering wheel located under the steering wheel, at least one flexible shaft having the inner end connected to the speed increasing gear mechanism, and a transmission mechanism connected between the outer end of the flexible shaft and the steered road wheels of the car for transforming and transmitting the turning or rotary movement to a swinging movement of the steered road wheels. In one embodiment, the transmission mechanism includes a speed reduction gear mechanism at the terminal output end of the flexible shaft. In one of the illustrated steering systems the flexible shaft comprises a primary flexible shaft and separate secondary flexible shafts for each of the steerable elements and an intermediate gear train having an output shaft for each steerable element and connected to the speed increasing gear mechanism through the primary flexible shaft and to the reduction gearing through the secondary flexible shafts. The reduction gearing may be connected to a screw type linear actuator which pivots the steerable element upon actuation of the steering member. A shock absorbing mechanism is also provided at the steering element which also transmit torque.

12 Claims, 15 Drawing Figures

STEERING SYSTEMS

This application is a continuation of my earlier application entitled "Improvements in Steering System" filed Feb. 27, 1976, bearing Ser. No. 661,812 (now abandoned) which in turn is a continuation-in-part of my prior application entitled "Steering System" filed Nov. 20, 1975, bearing Ser. No. 643,162, which in turn is a continuation of my earlier application entitled "Steering System" filed Nov. 4, 1974, bearing Ser. No. 520,654, and my prior application entitled "Improvements in Steering Assemblies" filed June 19, 1975 bearing Ser. No. 588,357, which in turn is a continuation-in-part of my earlier application entitled "Improvements In Steering Assemblies", filed Feb. 9, 1973 bearing Ser. No. 331,188, and now abandoned.

BACKGROUND OF THE INVENTION

1. Field of the Invention

The present invention relates to steering assemblies for vehicles, vessels and craft of the type having swingable travel direction adjustment accomplishing means, such as the steered road wheels of an automobile and the rudder of a vessel or a craft.

2. DESCRIPTION OF THE PRIOR ART

Conventional assemblies for steering an automobile comprise a steering wheel provided at one upper end of a rigid steering shaft enclosed within a rigid steering column and extending from the instrument panel at the driver's seat to near the front axle of the automobile, a device provided at the other lower end of the steering shaft for transforming the rotational movement of the shaft into an axial movement (transverse to the direction of travel) of a rod-shaped drag link, and a device for transforming the axial movement of the drag link into a swinging movement of the front wheels. In these conventional steering systems, there is a lag in the response from the steering wheel to the steered wheels which may be termed "play"; that is, a predetermined angular movement of the steering wheel is required before there is a direct response at the steered wheels. Play is attributable to and a function of the tolerences in the various actuators and linkages converting rotary motion of the steering wheel shaft into a swinging movement of the steered wheels. When these tolerances are within prescribed limits, the play is considered normal and tolerable and not deleterious.

It has been necessary to adapt and dimension the different elements of this assembly separately to each type of automobile, and, consequently, it has come to be relatively expensive. A change in the location of the steering wheel, for example from right hand to left hand steering, has necessitated considerable and expensive alterations.

SUMMARY OF THE INVENTION

In accordance with one embodiment of the present invention, the steering assembly comprises a steering member movable at a variable speed, a speed increasing gear connected to the steering member, at least one flexible shaft connected at its inner end to the speed increasing gear mechanism and at its opposite end to the actuator coupled to the steered wheels and operable to convert rotary motion of the steering wheel and flexible shaft to a linar output and thereby impart a swinging movement to the steered wheels. In these systems, the function of the speed increasing gear is to minimize "play" in the system resulting from the normal torsional deflection of the flexible shaft in operation of the steering system, transmit torque and effect a predetermined linear stroke of the actuator.

In accordance with another embodiment, the steering assembly comprises a steering control having a rotatable steering wheel, known per se, a speed increasing gear, known per se, for the rotatory motion of the steering wheel and located under the steering wheel, at least one flexible shaft, known per se, having one end connected to the speed increasing gear and the other to a reduction gear, known per se, and further, means, known per se, for imparting to the steered front wheels or the like a swinging motion in acordance with the rotation of the steering wheel. By using a speed increasing gear at the steering wheel end and a reduction gear at the other end of the flexible shaft, the torsion spring effect inevitably obtained at said other end of the flexible shaft may be reduced to such a high extent that there is no feeling of substantial play when turning the steering wheel.

It has been found that in a steering system wherein the output end of the flexible shaft is directly coupled to the actuator, the preferred minimum speed increasing ratio of the speed increasing gear mechanism is at least about 1:12 and is preferably in a range between about 1:12 to 1:30. In a system incorporating both speed increasing and speed reduction gear mechanisms, it has been found that the minimum overall speed increasing ratio may be as low as about 1:6.5. In these systems the speed increasing ratio of the speed increasing gear mechanism is preferably about 1:15 and the speed reduction ratio of the speed decreasing gear mechanism is about 1.75:1 to provide a minmimum overall speed increasing ratio in the system of about 1:8.57. In these ranges, the torsional spring effect of the flexible shaft is reduced to such an extent than there is no feeling of substantial play when turning the wheel.

The steering assembly of the present invention makes it possible (a) to standardize to a very high degree the elements comprised therein, (b) to shift the location of the steering wheel from right-hand to left-hand side and vice versa at any time, and (c) to make the whole assembly such that it cannot injure the driver when possibly colliding or driving off the road. Owing to the standardization, the cost for the steering assembly can be reduced considerably.

To eliminate the consequences of a possible shaft break it is preferred to use two flexible shafts connected in parallel to each other. Then, it is also preferred to subject said two flexible shafts to oppositely directed torsional prestresses in order to reduce the torsion spring effect.

BRIEF DESCRIPTION OF THE DRAWINGS

FIG. 1 is a schematic top plan of a steering system in accordance with the present invention;

FIG. 2 is a view taken on lines 2—2 of FIG. 1 showing the pivotal connection of the actuator to the steering arm and the tie rod assembly;

FIG. 4 is an enlarged sectional view taken on lines 4—4 of FIG. 3a;

DESCRIPTION OF THE PREFERRED EMBODIMENTS

Referring now to the drawings and particularly FIGS. 1-4 thereof, there is illustrated a steering system embodying the present invention. Even though the system shown is for a road vehicle, such as an automobile, it is useful in other applications. Basically, the system comprises a steering member movable at a variable speed between first and second limit positions and transmission means connecting the steering member to travel direction adjustment means, for example, the steered wheels of an automobile. The transmission means comprises at least one flexible shaft, a speed increasing gear mechanism between the steering member and the input end of the flexible shaft and an actuator connected between the output end of the flexible shaft and the steered wheels, said actuator adapted to convert rotary motion of the flexible shaft to a linear output whereby movement of the steering member between limit positions effects a predetermined displacement of the steered wheels. The speed increasing ratio of the speed increasing gear mechanism is at least about 1:12 and is preferably in the range of between 1:12 and 1:30.

The speed increasing gear mechanism in the flexible shaft steering system of the present invention provides the important function of minimizing the inherent spring effect due to torsional deflection of the flexible shaft and thus controls "play" in the system. It also provides a mechanical advantage in the system so that the torque required at the steering wheel to produce the necessary linear force output at the actuator to turn the wheels can be maintained within prescribed limits. This is particularly significant in some automotive applications where the steering arm must be of a length not greater than the radius of the steered wheel and the torque at the steering wheel has an upper limit to facilitate ease of turning. Additionally, the speed increasing gear mechanism provides a means for selectively varying the range of rotation of the steering wheel in relation to the actuator stroke, an important design capability in applications where the total stoke of the actuator is relatively fixed (steering arm length limits) and the steered wheels must be capable of a full pivotal range (90°) during actuation of the steering wheel a predetermined number of turns (usually between 2.5 and 4 revolutions).

Figures 1, 2, 4:
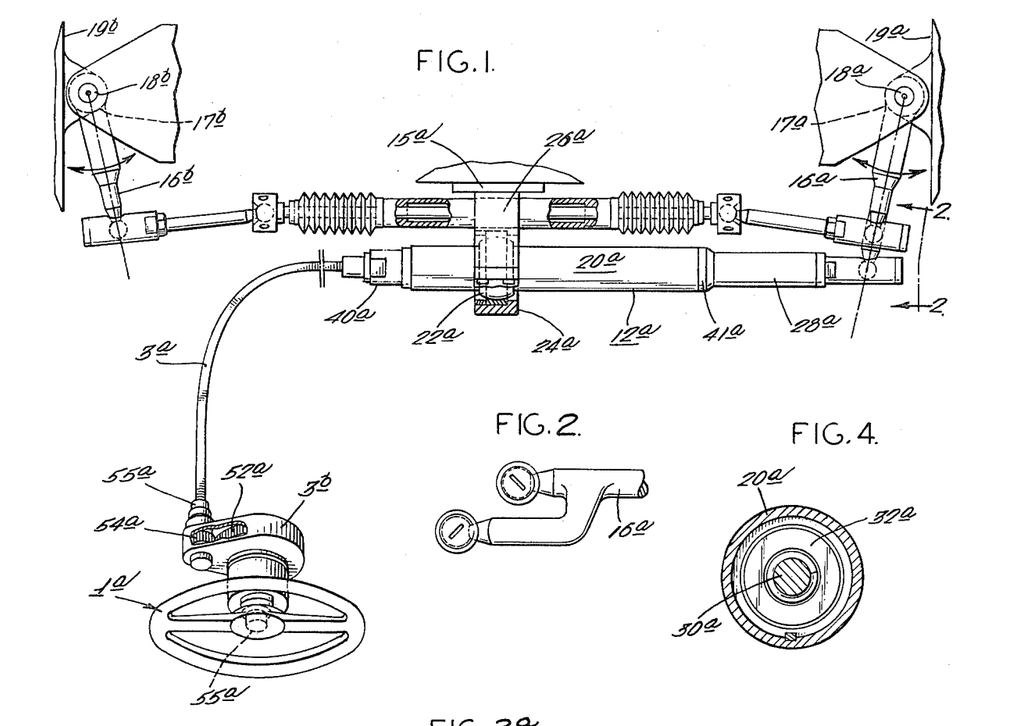

Considering now more specifically the details and arrangement for the system and with particular reference to FIG. 1, the system comprises a steering member, in the present instance, a steering wheel 1a connected to a gear mechanism or actuator 12a through a speed increasing gear mechanism 2a and a flexible shaft 3a comprising a flexible core and a casing within which the core rotates. As illustrated, the actuator 12a is pivotally connected to the steering arm 16a of one of the wheels 19a and through a tie rod assembly 15a to the steering arm 16b of the other steered wheel 19b. As is conventional, the steering knuckles 17a, 17b, of the steering arms 16a, 16b, carry the steered wheels 19a, 19b of the vehicle and are mounted to swivel about substantially vertical king pins 18a, 18b.

Figure 3A:
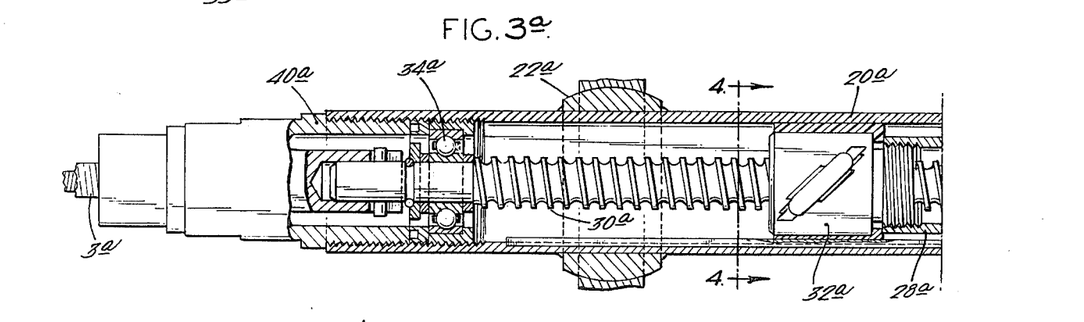
FIGS. 3a and 3b are fragmentary sectional views of the actuator for converting rotary motion of the flexible shaft to a linear output.
Figure 3B:
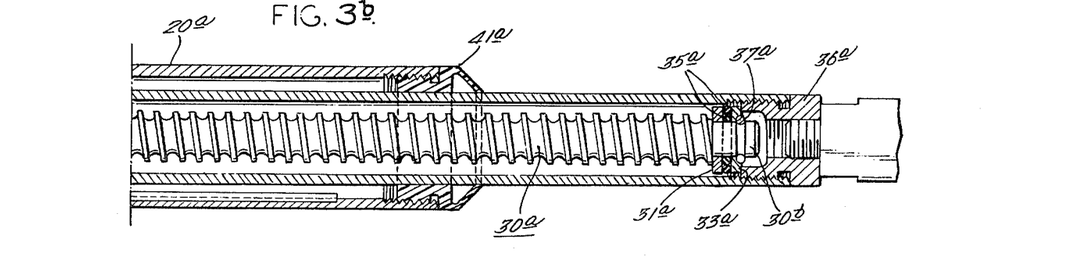

The actuator 12a, which is of generally conventional design, comprises an outer tubular housing 20a, in the present instance, journalled in a spherical plain bearing 22a consisting of inner and outer rings having sphered contact surfaces, the outer ring being mounted in a collar 24a secured to the tie rod housing 26a which may be fastened to the front axle of the vehicle and a tubular casing 28a telescopically mounted in the housing 20a and adapted for movement axially therein by means of a rotatable screw member 30a and a travelling ball nut 32a. The displacement of the casing 28a is defined as the stroke of the actuator. The elongated screw member 30a, as illustrated, is journalled at its driven end in a bearing 34a in one end of the outer housing 20a and at its opposite end is rotatably supported in a closure member 36a mounted in the outer end of the inner tubular casing 28a. The closure member 36a has an internally threaded bore to receive the ball joint for connection to the steering arm 16a. The cylindrical non-driven end 30b of the screw member 30a mounts a double acting movement limiter comprising two washers 31a, 33a with a loose fit on the cylindrical end portion and spaced apart axially by two concentric O-rings 35a supported on the end portion by means of a clip spring 37a engaging in a groove 39a in the terminal end portion 30b of screw member 30a.

The travelling ball nut 32a is mounted in the inner end of the casing 28a and to this end is provided with a reduced diameter having external threads which are received in the internally threaded inner end portion of the casing 28a.

An adaptor 40a is threadedly received at the inner end of the outer housing 20a to mount the driven end of the flexible shaft 3a to the rotating screw 30a.

The actuator assembly also includes an annular seal 41a supported in the outer end of the housing 20a and contacting the outer peripheral surface of the casing 28a.

The speed increasing gear mechanism 3b comprises in the present instance, a planetary gearing consisting of a large gear wheel 52a mounted on the steering wheel shaft 53a which meshes and drives a smaller gear 54a carried by an output shaft 55a to which the inner end of the flexible shaft 3a is secured. This gear mechanism preferably is designed to produce a speed increasing ratio of at least 1:12 at the input end of the flexible shaft so that for each full revolution of the steering wheel 1a, the flexible shaft makes 12 revolutions. Rotation of the flexible shaft produces at its outer end a corresponding number of revolutions of the screw member 30a, which in turn through the ball nut effects axial movement of the casing 28a and pivotal movement of the wheels through the steering arm and tie rod linkage.

For a given diameter and pitch of the screw member, and for a given speed increasing ratio, the stroke of the actuator may be controlled within a predetermined range. For example, with speed increasing ratios in the range of between 1:12 to 1:30 and an actuator screw having a diameter of 20mm and a lead or pitch of 4 to 6 millimeters, 2.5 to 3.5 revolutions of the steering wheel will produce a stroke of between 120 and 630mm. In automotive applications, strokes of between 150 and 200mm are of interest to effect swinging movment of the steered wheels through the desired arc of 90° during rotation of the steering wheel between 2.5 and 4 revolutions. Further, as discussed in more detail below, in this range the steering wheel force may be maintained within prescribed limits to generate the torque needed to produce the necessary linear actuator force with a minimal play in the system employing a flexible shaft having a diameter of about 8mm and a length of between 1 to 6 meters. It is desirable to maintain the shaft diameter as small as possible to permit greater bending radii and thus, greater design flexibility for the system.

Even though the ratio ranges for the speed increasing gear mechanism and the overall speed increasing ratio set forth above are preferred limits to provide a system wherein the torsional effect (play) of the flexible shaft is minimized, there are various parameters which determine performance characteristics and particulars of the system. A typical illustration of the design process wherein parameters such as play, speed increasing gear ratio and flexible shaft characteristics, i.e., core diameter and length is as follows:

In general, the starting point in designing a system is to determine (a) the required linear force to actuate the travel adjustment means, for example, the steered wheels and (b) the actuator stroke needed to pivot the steered wheels between extreme limit positions, for example, 90°. When the required linear force and stroke have been established, a suitable screw diameter and lead for the actuator is selected. Once these parameters have been fixed, the torque on the flexible shaft can be calculated. When the required torque is transmitted by a directly connected flexible shaft, the core dimensions of the shaft can be selected by reference to generally known data available in reference manuals such as the Flexible Shaft Engineering Handbook published by Stow Manufacturing Co. of Binghamton, New York. The speed increasing ratio is then determined and is a function of the core load divided by the product of the permissible steering wheel force and the steering wheel radius. The steering wheel radius and the maximum permissible steering wheel forces are set, the core load is known and thus, the desired and necessary speed increasing ratio may be determined. For example, the maximum force on the steering wheel for a passenger car to permit ease of operation by even a fragile operator is in the range of 14 to 16 kiloponds (about 31 to 35 pounds) and a typical steering wheel has a radius of between 175 to 200mm (7 to 8 inches).

When the above parameters have been calculated, the maximum RPM of the flexible shaft is checked to determine whether it falls within rated limits for the shaft. For example, in a passenger car, the maximum RPM of the steering wheel is 500°/second, 83.3 RPM. The RPM limits for flexible shafts having a core diameter between 8mm and 12.5mm is in the range of 1150 to 1800 RPM's.

The system is then examined for play due to the inherent torsional deflection of the flexible shaft to determine whether it is within tolerable limits. In some automotive applications, a typical torque requirement is 60 newtonmeters/radian (530 pound-inches/radian) measured on the steering wheel. Thus, a flexible shaft having a diameter of about 8 mm, will deflect 12° and for a 6 meter shaft, the total deflection will be 240'. In a system wherein the speed increasing gear ratio is 1:12, the torsional deflection is 20° (240°/12) and the torque is about 172 newton-meters/radian (about 1520 pound-inches/radian). In most steering systems for automobiles the shaft is considerably shorter, for example, in the range of about 1 to 1.5 meters and thus the total torsional deflection is less. For example, if the shaft length is 1.5 meters, the play due to torsional deflection of the shaft in the load ranges indicated is about 5°. This is considered minimal and within safe tolerences.

Figures 5, 6:
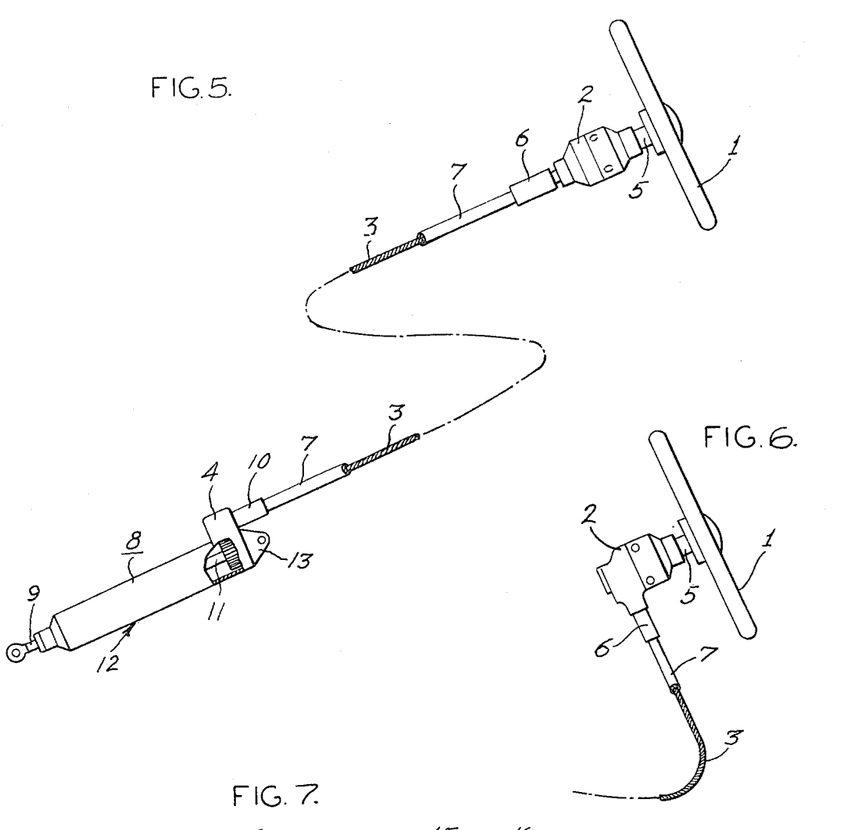
FIG. 5 is a schematic view of elements included in another embodiment of steering assembly according to the present invention for use in automobiles.
FIG. 6 is a fragment of the view in FIG. 5 illustrating an alternative embodiment of the present invention.

There is illustrated in FIG. 5 another embodiment of steering assembly or system in accordance with the present invention. The system is basically similar to that described above and includes additionally a speed reduction gear mechanism interposed between the output end of the flexible shaft and the actuator. Thus, this system includes a steering control comprising a rotatable steering wheel, a speed increasing gear, at least one flexible shaft, a speed reduction gear, and means responsive to the output speed of the speed reduction gear for imparting to swingabe travel direction adjustment accomplishing means a swinging motion in accordance with the rotation of the steering wheel. The steering wheel is rotatable at a variable speed, and the speed increasing gear is connected between the rotatable steering wheel and one end of the flexible shaft for transforming an input speed, identical to the rotational speed of the steering wheel into a higher output speed.

Considering now in more specific detail, the elements of the system, in the embodiment illustrated in FIG. 5, the speed increasing gear 2 is a planetary gearing having a slowly rotating input shaft 5, to which the steering is secured direct or indirect, and a fast rotating output shaft 6, to which one end of the flexible shaft 3 is secured. The speed increasing gear 2 is attached to the underside of a dashboard, not shown, or other structure in front of the driver, helmsman or pilot by means of conventional plastically deformable impact absorbing means, not shown. The attachment is such that the steering wheel 1 and the input shaft 5, as is usual, have a certain inclination, whereby the speed increasing gear is located under the steering wheel 1. The input shaft 5 and the output shaft 6 are coaxial or parallel to each other and the speed increasing ratio is relatively high, for example 1:22. Thus, one revolution of the steering wheel 1 causes the flexible shaft 3 to complete twenty-two revolutions. The flexible shaft 3 may have a diameter of about 10mm and preferably is confined in a protecting flexible tube 7, having an internal liner of, for example, polytetrafluoroethylene.

Further, the speed reduction gear is connected to the other end of the flexible shaft for transforming an input speed, identical to the rotational speed of the flexible shaft, into a lower output speed, and the speed responsive means connects the speed reduction gear to the swingable travel direction adjustment accomplishing means. In some cases it is possible to connect the speed reduction gear to the rotational axis of the swingable travel direction adjustment accomplishing means over a very simple speed responsive means, but as a rule, it is preferred to use a speed responsive means comprising a mechanism, such as a screw and nut transmission, for transforming rotary motion into translatory motion. Then the mechanism is connected direct to the speed reduction gear and direct or preferably indirect over at least one link member, to the swingable travel direction adjustment accomplishing means at a location spaced from the rotational axis thereof. In the embodiment illustrated in FIG. 5, the reduction gear 5 has a fast rotating input shaft 10, to which the other end of the flexible shaft 3 is secured, and a slowly rotating output shaft 11. The motion transforming mechanism is a screw and nut transmission 8, preferably a ball-screw or roller-screw and nut assembly, known per se and having an axially movable output rod 9. The slowly rotating output shaft 11 is drivingly connected either to the nut member or to the screw member of the transmission 8, and the other member is secured against rotation within a transmission housing and is drivingly connected to the axially movable rod 9. The speed reduction ratio of the reduction gear 4 is relatively low, for example 3.4:1. Thus, to make the output shaft 11 complete one revolution, the input shaft 10 has to make 3.4 revolutions. The screw member may have a diameter of, for example, 20mm and a pitch of, for example, 6mm. With the above gear ratio 3.4 revolutions of the steering wheel will give the axially movable rod 9 a stroke of about 130mm. In the system described, incorporating a speed increasing gear mechanism having a speed increasing ratio of 1:22 and a speed reduction gear mechanism having a speed reduction ratio of 3.4:1, the overall speed increasing ratio of the system is about 1:6.5. In these systems, it has been found that the efficiency is maximized and the gearing simplified when the ratio of speed increasing gear mechanism is about 1:15 and the ratio of the speed reduction gear mechanism is about 1.75:1 providing an overall speed increasing ratio in the system of about 1:8.57. It has been found that in a steering system having this overall speed increasing ratio, torsion effect of the flexible shaft is minimized so that the response of the steered wheels to rotation of the steering member is relatively direct and there is no feeling of substantial play in the steering member when it is rotated to actuate the steered wheel.

The steering system described above incorporating a speed reduction gear mechanism provides all of the above functional advantages of the directly coupled system of FIGS. 1-4 inclusive and additionally adds to the system other capabilities such as (a) coordination of steering wheel range to actuator stroke, (b) control of steering wheel force for a given actuator stroke, and (c) minimization of stroke error upon loading which is of particular importance in systems employing a relatively long flexible shaft.

(a) Actuator Stroke —Steering Wheel Range

The stroke of the actuator is proportional to the displacement of the steering wheel by the overall speed increasing ratio of the system. Therefore assume that, in a directly coupled system, for a given speed increasing ratio, for example, 1:12, rotation of the steering wheel through only one half its required range produces the maximum actuator stroke. Thus, by adding a speed reduction gear mechanism having a 2:1 speed reducing ratio, the overall speed increasing ratio is halved and the range of the steering wheel is doubled to produce the maximum actuator stroke.

(b) Steering Wheel Force

Assume that in a directly coupled system as in (a) above, the maximum permissible force F at the steering wheel is too high, by adding a reduction gear and increasing the ratio of the speed increasing gear by the ratio of the reduction gear, the force at the steering wheel may be reduced by half without changing the actuator force.

(C) Stroke Error

In a system requiring a comparatively long flexible shaft, for example, a 6 meter shaft, the torsional deflection for a steering wheel torque of 3 kilopond-meters is 120°. Thus, the stroke shortfall in a directly coupled system with an actuator having a pitch of 6mm is 2mm (120°×6/360). Thus, if the ratio of the speed increasing gear is increased by the ratio of the speed reduction gear, the stroke error can be reduced by the ratio of the reducing gear, that is, 1/3 of 2mm or 0.67mm.

The various parameters for a steering system is accordance with the present invention may be calculated in accordance with the following equation:

$$F_a = \frac{2\pi}{L_a} \times R_r \times \left( \frac{F_w \times r_w}{R_i} \right)$$

In the equation, $F_a$ is the desired force output of the actuator;

$L_a$ is the screw lead of the actuator in meters;

$R_r$ is the ratio of the speed reduction gear mechanism;

$F_w$ is the maximum permissible peripheral force on the steering wheel;

$r_w$ is the steering wheel radius; and $R_i$ is the ratio of the speed increasing gear mechanism. (In a directly coupled shaft system the factor is 1.)

As discussed above, the requirements of a given steering system to a great extent will govern the final determination of its parameters. For example, in automotive applications, some car manufacturers require that the steering system by capable of withstanding a static test torque of 200 newton-meters (1767 pound-inches) and a maximum steering wheel speed of 500°/second, about, 83.3 RPM, for safe response in an emergency situation. It is noted that many car manufacturers set a lower standard of 360°/second or about 60 RPM.

It has been found that a steering system incorporating a flexible shaft having a core diameter of 10mm and both speed increasing and speed reduction gear mechanisms in the preferred ratios set forth above, that is, one having a speed increasing ratio of 1:15, a speed reduction ratio of 1:75.1 and an overall speed increasing ratio of 1:8.57, satisfies the above requirements and provides certain advantages discussed below.

Analyzing the preferred system in view of the requirements and applying the principles for calculating the various parameters in the system employed previously, it can be seen that for a core diameter of 10mm, the maximum permissible torque is 120 pound-inches. With a speed increasing ratio of 1:15, the core will stand 1800 pound-inches (120 pound-inches × 15) or 207 newton-meters. Thus, the core meets the static requirement of 200 newton-meters. The core speed at a steering wheel speed of 500°/second is 1250 RPM, within the 1500 RPM maximum permissible operating speed of a 10 mm shaft. A steering wheel torque of 60 newtonmeters will produce a torque on the core of 35 pound-inches and under these conditions, the spring rate of the overall system from the steering wheel to the reduction gear is 737 newton-meters/radian, and with a torsional deflection of 14°/ft., a core having a length of 5 ft. will deflect 70°. Thus, a steering wheel rotation of one radian corresponds to a core rotation of 860° and taking the deflection into account, the output end of the core will rotate 790°. This rotation through the reduction gearing is reduced to 451° so that an actuator having a lead of 6 mm produces an axial displacement of about 7.5 mm. It has been found that this displacement is permissible without passing the limit for the overall spring rate.

The advantages of the preferred system described above, particularly in automotive applications, is a significant decrease in the acceleration and retardation energy compared, for example, to a system having a greater speed increasing ratio of 1:28, a reduction ratio of 3.5:1 and a core diameter of 8 mm. In these applications, this means that the car is easier to steer and less power is needed to rotate the steering wheel quickly. The core energy in the preferred system is reduced by approximately 30%. Further, in the preferred system, the overall efficiency of the system will be improved since a lower speed increasing ratio produces a higher efficiency and a lower core peripheral speed reduces friction losses between core and casing, the reduction being in the order of about 33% compared to an 8 mm system with the greater step-up and reduction ratios noted. The preferred system is also of simplified design and less expensive to manufacture. Another advantage is that the spring rate is reduced by almost 50% so that the steering will be softer and have a greater ability to absorb shocks from the steered wheels and fall within an acceptable range to fulfill the requirements of car manufacturers. Even though in the preferred system the minimum operating radius of the core is increased and the longer shaft is somewhat more expensive, these are comparatively minor drawbacks in light of the other advantages noted above.

FIG. 6 illustrates the possibility of incorporating in the speed increasing gear 2 is belev gearing or a skew-axes gearing for increasing the latitude in selecting the most advantageous path for the flexible shaft 3 between the speed transforming gears 2 and 4.

Figure 7:
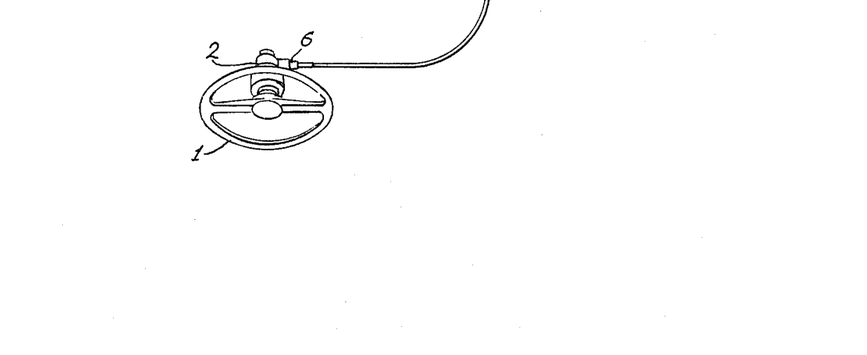
FIG. 7 is a schematic top plan view incorporating the features disclosed in FIGS. 5 and 6 illustrating a complete steering assembly.

FIG. 7 shows the principles for connecting the steering assembly of FIGS. 5 and 6 to the steered road wheels of an automobile.

As above the speed reduction gear 4 and the screw and nut transmission 8 are combined to form a steering gear 12, wherein the rotary motion transferred from the steering wheel over the speed increasing gear 2 and the flexible shaft 3 is transformed into a translatory motion of the rod 9 at one end of the steering gear 12. The other end of the steering gear has a lug 13 (FIG. 5) and is pivotally secured to the front axle (not shown) or other supporting structure of the automobile. A steering arm 14 has one end pivotally secured to the same or other supporting structure and the free end of the rod 9 is pivotally secured to the steering arm 14 at a position spaced from the arm ends. The other end of the steering arm 14 is connected over ball joints or similar articulations to the inner ends of a divided tie rod 15. Each outer end of the divided tie rod is connected in a similar manner to an arm 16 of a steering knuckle 17, and each steering knuckle can be swivelled around a substantially vertical king pin 18 and carries one of the steered road wheels 19 of the automobile.

Figure 8:
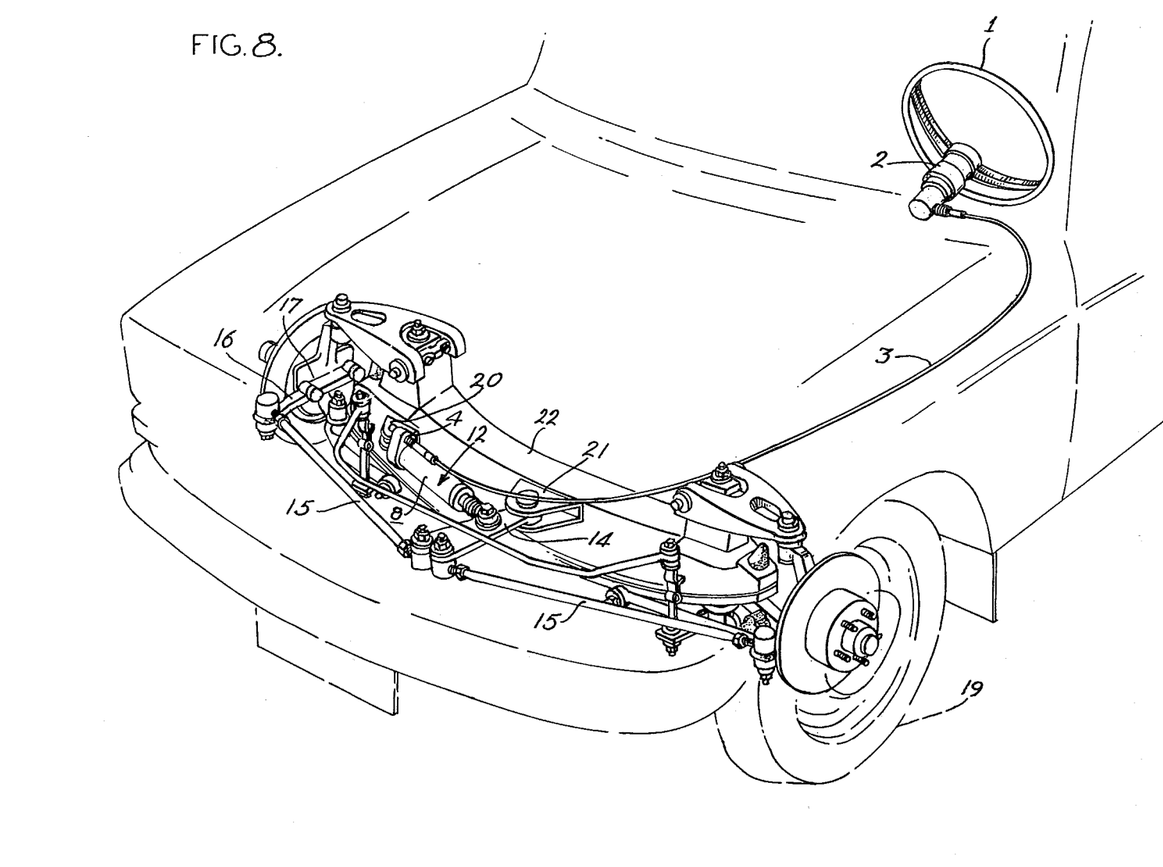
FIG. 8 is a schematic perspective view of the front end of an automobile equipped with the steering assembly of FIG. 7.

FIG. 8 shows one preferred embodiment of the steering assembly of the present invention when applied to a conventional passenger car. The rotary motion of the steering wheel 1 is speeded up by the speed increasing gear 2 and transferred by the flexible shaft 3 to the steering gear 12, where the speed is reduced and the rotary motion is transformed into translatory motion.

Two holders 20 and 21 are secured to the front side of the front axle 22, one (20) for the lug of the steering gear 12 and the other (21) for the rear end of the steering arm 14. The axially movable output rod of the steering gear 12 is confined in a protecting bellows and is pivotally secured to the steering arm 14 at a position spaced from the arm ends. Thus, a rotation of the steering wheel 1 imparts a swiveling motion to the steering arm 14, and the swiveling motion is transmitted to the front wheels 19 over a divided tie rod 15, the steering knuckle arms 16, and the steering knuckle 17 as described in connection with FIG. 7.

Figure 9:
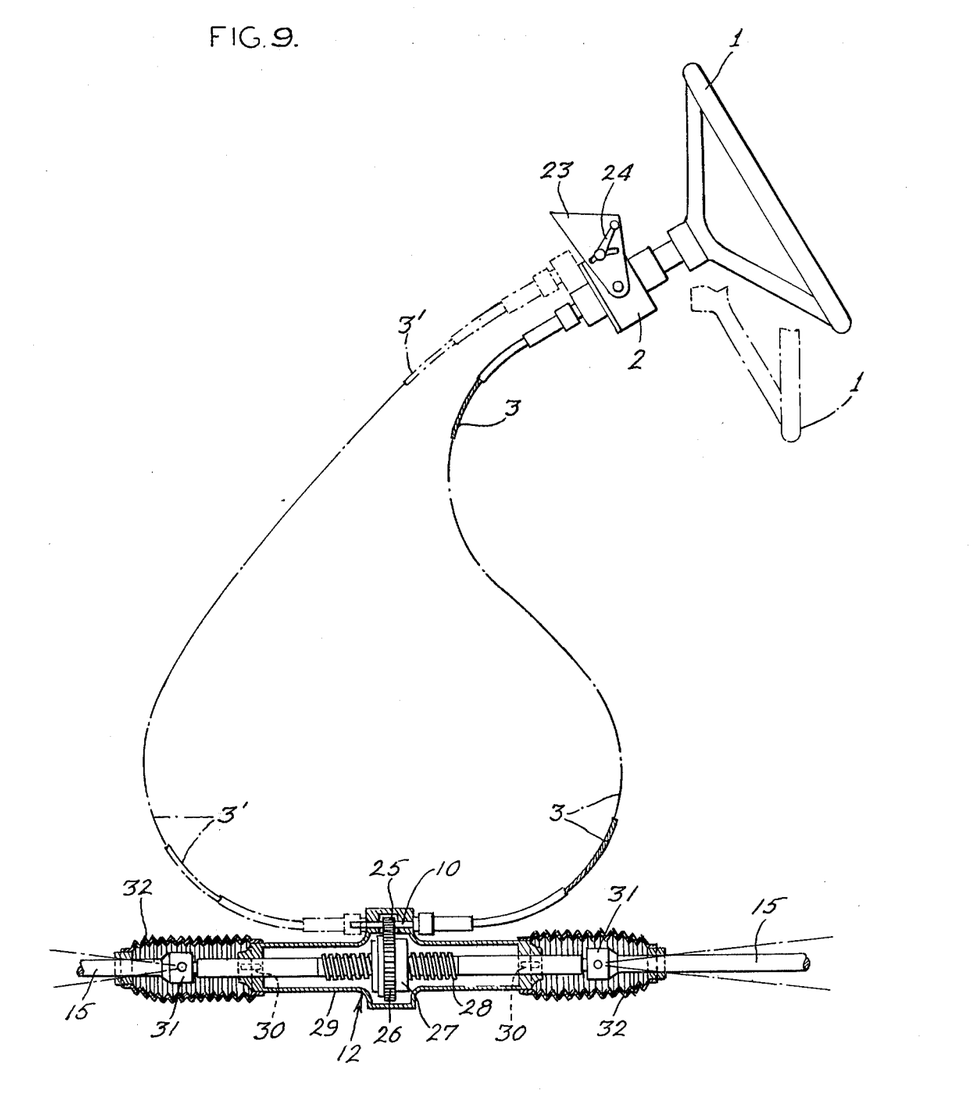
FIG. 9 is a schematic view similar to FIG. 5 but illustrating another preferred embodiment of the present invention.

FIG. 9 illustrates another preferred embodiment of a steering assembly for automobiles. The steering wheel 1 is as above connected to a steering gear 12 over a speed increasing gear 2 and at least one flexible shaft 3. The speed increasing gear 2 is hinged in a bracket 23 so that the driver can adjust the inclination of the steering wheel 1 by means of, for example, a lever 24. The speed reduction gear of the steering gear 12 comprises an input shaft 10 journalled at its end portions and carrying at its central portion a small gear wheel 25, and a mating larger gear wheel 26 secured coaxially to the nut 27 of a ball screw and nut assembly. The nut 27 is journalled in two axial bearings, not shown, and operates on a central portion of the screw 28. The end portions of the screw 28 are unthreaded and extend exteriorly of a substantially tubular steering gear housing 29. The screw 28 is secured against rotation by keys 30 provided in the housing 29 and mating longitudinal grooves, not shown, in the unthreaded end portions of the screw 28. Each end of the screw 28 is connected to one end of a drag link 15 over a ball joint 31 of similar articulation, and the other end of the drag link is connected in a similar manner to a steering knuckle, not shown. Each ball joint 81 is confined in a bellows 32 secured to the housing 29 and to the drag link 15 for preventing dirt and other contaminants from entering into the steering gear 12.

The input shaft 10 of the steering gear 12 is parallel to the screw 28 and extends right through a central portion of the housing 29, so that the shaft ends protrude from the housing. One end of the shaft 10 is connected to the flexible shaft 3 and the other end may be used for connecting a servomechanism to the steering assembly. However, as indicated by dot-dash lines in FIG. 9 said other shaft end may also be used for connecting a second flexible shaft 3' between the steering gear 12 and the speed increasing gear 2, which then has to be equipped with two output shafts having opposed directions of rotation and identical rotational speeds. For example, a pair of identical gears may be provided, one gear being formed integral with the ordinary output shaft and the other being formed integral with the second output shaft of the speed increasing gear 2.

By using two flexible shafts 3 connected in parallel to each other the consequences of a possible shaft break are eliminated and, moreover, it is possible to reduce the aforementioned torsion spring effect by subjecting the two flexible shafts to oppositely directed torsional prestresses. The flexible shafts 3 may be subjected to torsional prestresses in many different ways. For example, first the two ends of one of the flexible shafts 3 are connected to one of the output shafts of the speed increasing gear 2 and to one end of the input shaft 10 of the steering gear 12, respectively. Then, one end of the second flexible shaft is connected to the other output shaft of the speed increasing gear, and the steering wheel is rotated in one direction while preventing the input shaft 10 of the steering gear 12 from rotating. Thereafter, the free end of the second flexible shaft is rotated in the opposite direction and then connected to the other end of the input shaft 10 of the steering gear. When as a final step the steering wheel is released the torsional prestresses imparted to the two flexible shafts will oppose each other and considerably reduce any relative angular displacement of the steering wheel axis with respect to the input shaft 10 of the steering gear 12.

Figure 10:
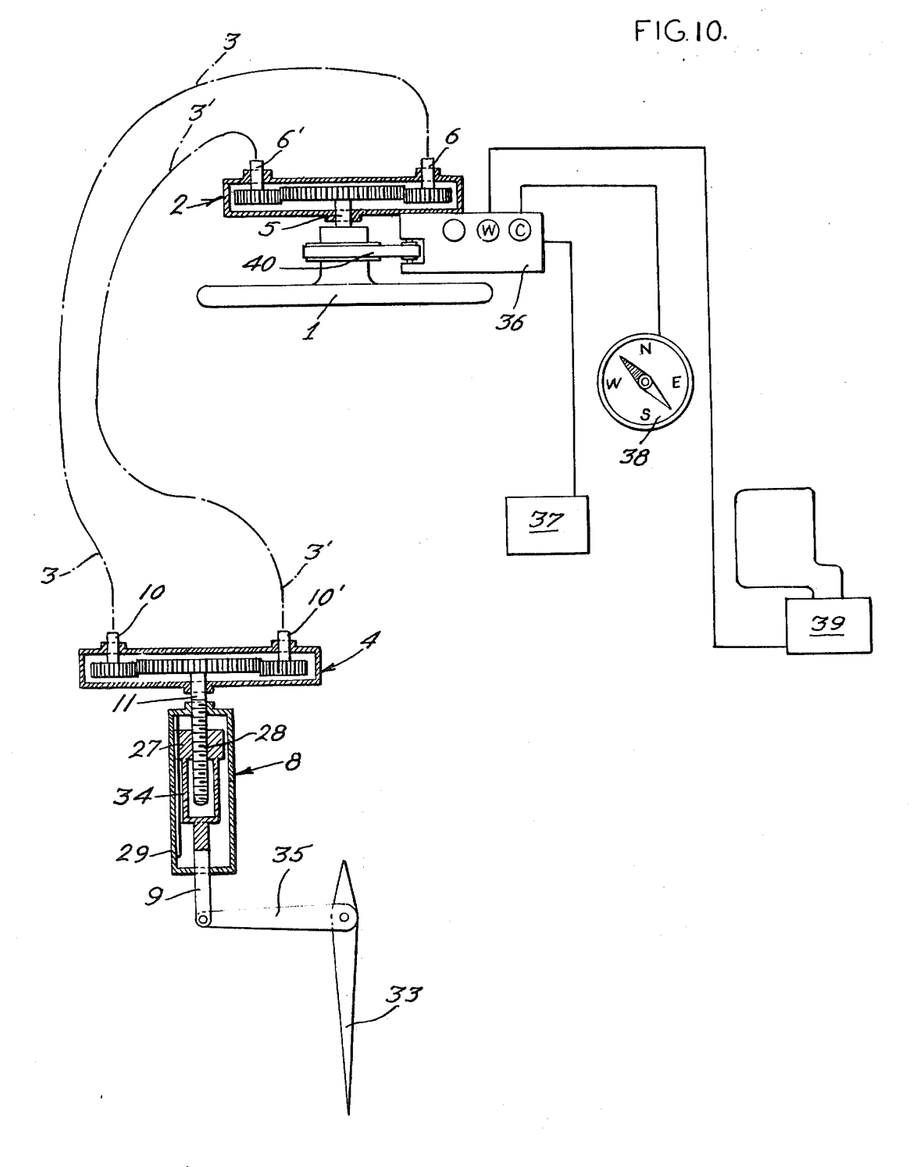
FIG. 10 is a schematic and partly diagrammatic view of another embodiment of the steering assembly of the present invention adapted for use in vessels and craft.

In comparison with prior art steering assemblies for cars the present invention presents many advantages, such as:

a lower total cost;

no conventional rigid steering shaft for safety reasons;

simpler production of left-hand and right-hand driven cars;

the engine compartment may be utilized better;

easier mounting;

greater freedom of choice with respect to the location of the steering gear;

a smaller number of wear elements;

lower friction losses;

adjustable inclination of the steering wheel easily arranged; and easier furnishing of spare parts. FIG. 10 shows a steering assembly of the present invention operatively connected to the rudder 33 of a vessel or craft. The steering control includes a steering wheel 1, which is secured to the slowly rotating input shaft 5 of a speed increasing gear 2 having two output shafts 6 and 6' rotating faster with identical speeds. Each fast rotating output shaft is operatively connected, by means of a flexible shaft 3 and 3', to one of two fast rotating input shafts 10 and 10' of a speed reduction gear 4. The flexible shafts 3 and 3' are torsionally prestressed as described in connection with FIG. 9. The slowly rotating output shaft 11 of the speed reduction gear 4 is secured to or integral with the screw 28 of a ball-screw and nut assembly 8. The nut 27 is secured against rotation by means of suitable elements, such as an elongated guide provided parallel to the screw 28 within a housing 29 encompassing the ball-screw and nut assembly 8, and a guide follower provided on the nut 27. A rigid tube member 34 is coaxial with the screw 28 and connects the nut 27 to an axially movable rod 9 coaxial with the screw 28. The free end of rod 9 is pivotally connected to a tiller 35 fitted to the rudder-head of the rudder 33. In some cases it is, of course, possible to locate the speed reduction gear 4 right above the rudder 33 and to connect the slowly rotating output shaft 11 direct to the rudderstock over a shaft coupling or similar means responsive to the speed of the slowly rotating output shaft 11 for imparting to the rudder 33 a swinging motion in accordance with the rotation of the steering wheel 1. Thus, the mechanism 8 (or ball-screw and nut assembly) for transforming rotatory motion into translatory motion can be dispensed with, but also one of the flexible shafts 3 and 3' shown in FIG. 10 is dispensable.

As illustrated in FIG. 10, the steering control may include an electronic automatic pilot comprising, for example, a fully transitorized control unit 36 having integrated circuits, a power source 37, such as a storage battery of twelve volts, electrically connected to the control unit, a fully gimballed electronic compass sensing unit 38 electrically connected to the control unit, and an electronic wind vane sensing unit 39 electrically connected to the control unit. The control unit 36 comprises an electric motor, not shown, connected to the hub of the steering wheel 1 or to the slowly rotating input shaft 5 of the speed increasing gear 2 over a chain drive 40 or toothed belt drive.

To prevent excessive wear of rudderstock bearings due to continual rudder movements when the sea is rough, means for adjusting the sensitivity of the sensing units 38 and 39 as well as means for transmitting to or transforming within the control unit 36 those course correction signals only which outlast a predetermined adjustable minimum period, should be provided. The desired pilot course is selected by a simple rotation of a grid member included in the sensing unit 38 and 39, respectively. The control unit 36 has a selector switch for selecting manual steering by the helmsman, pilot steering controlled by the compass, and pilot steering controlled by the wind vane. Preferably, the control unit 36 further incorporates the following functional controls:

a rudder control giving infinitely variable proportional rudder movement to eliminate any tendency to over or under steer;

a trim control applying permanent helm to port or starboard as may be required when running on one engine in a twin engined craft, as well as allowing for fine course adjustment; and a yaw control preventing excessive rudder movement and allowing the vessel to move freely to the motion of the sea.

Thanks to the low friction of the steering assembly of the present invention, the current consumption will be low, and for small vessels and craft no servo-mechanism is necessary, so that the current consumption will be lowered still more. When a servo-mechanism is used it can be connected to the steering assembly at a location between the speed reduction gear 4 and the ball-screw and nut assembly 8 or as described in connection with FIG. 9.

While a few specific embodiments of the steering assembly of the present invention have been described in detail above, it is to be understood that various modifications may be made from the specific details described without departing from the spirit and scope of the invention. For example, the swingable travel direction adjustment accomplishing means may be an outboard motor swingably mounted to the stern of the small boat and having a steering handle to which the steering assembly would be connected.

Figure 11:
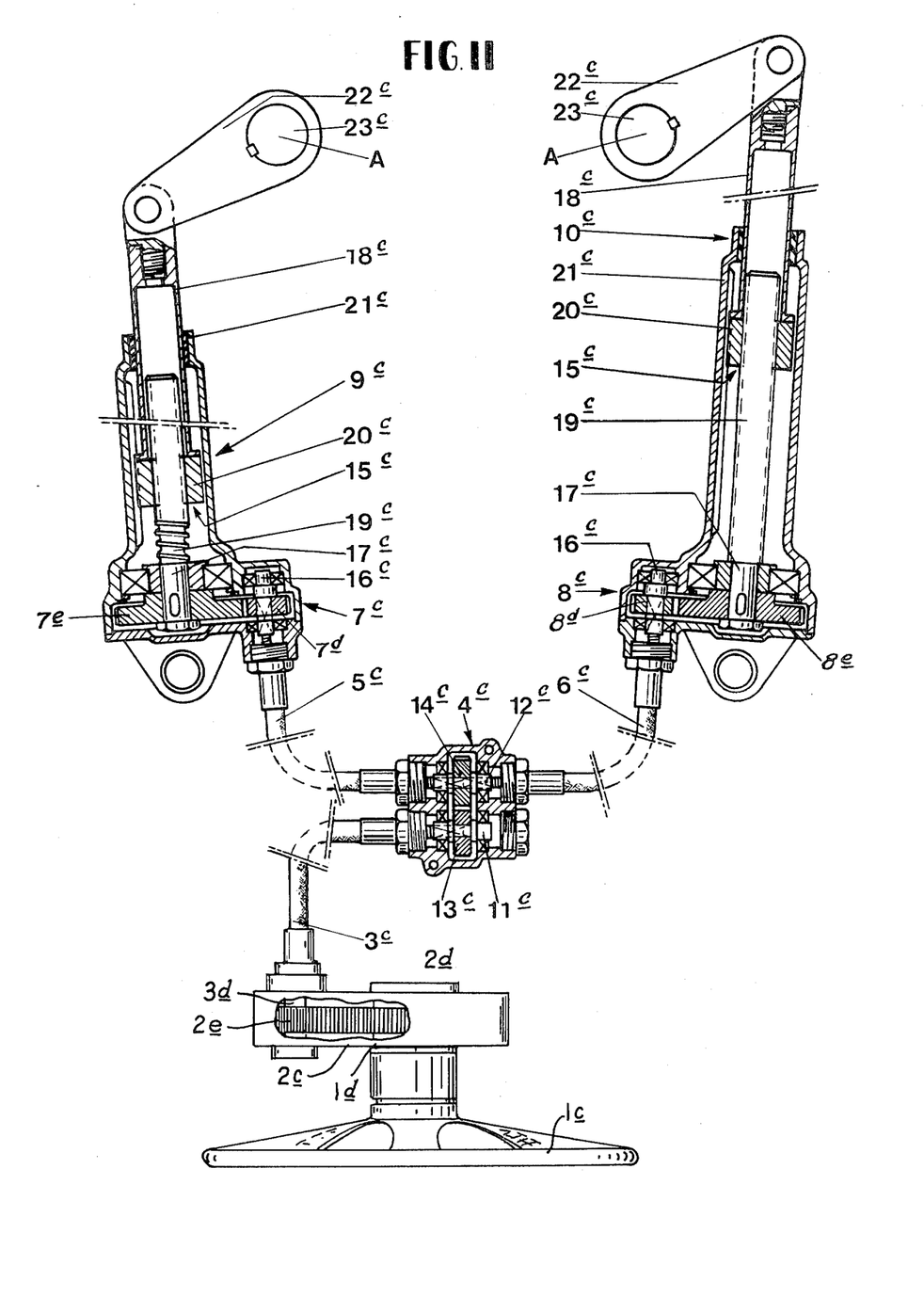
FIG. 11 is a schematic representation of another embodiment of steering system in accordance with the present invention.

There is illustrated in FIG. 11 another embodiment of steering system in accordance with the present invention. This system is similar to the previously described system in that it employs flexible shaft means between the steering wheel and the steered road wheels of a vehicle except that in the present instance, the rigid drag links in the system are eliminated. These drag links require large space and form an unsprung mass. According to this embodiment, each steerable element is provided with individual reduction gearing and the step up gearing and reduction gearing are mounted between a gear train having an input shaft driven from the step up gearing by means of a primary flexible shaft. The gear train has a plurality of output shafts for driving the individual reduction gearings, each individual reduction gearing being connected to the respective output shaft of the gear train by means of a separate secondary flexible shaft. This steering system provides more flexibility in designing the system and furthermore, the components used occupy far less space. Preferably the secondary flexible shafts between the output shafts, the gear train and the reduction gearing are of generally the same length thereby providing a uniform torsional deflection of the flexible shafts in the system.

The steering system may be employed in a vehicle having two steerable wheels, each mounted on a steering knuckle which swivels about the axis of a king pin means for permitting steering movements in response to the turning of the steering wheel. Advantageously, each reduction gearing is connected to the steering knuckle by a telescopic shaft assembly, one part of which is rotatably supported in the chasis of the vehicle, the other part being secured to the steering knuckle. In these systems the reduction gearings are suitably mounted in the chasis, one above each steerable wheel.

Another feature of the system illustrated in FIGS. 11-14 is that the telescoping shaft assembly comprises a shaft member and a housing capable of transmitting torsion and absorbing shock. The shaft assembly includes a piston slideably mounted in the cylinder so that the piston, cylinder and housing assembly form a shock absorber. Preferably, each of the reduction gearings is directly connected to a linear actuator such as a screw and nut transmission of the type wherein balls are provided between the screw and the nut. Reduction gearing rotates the screw and causes the nut to travel along the screw. A lever converts the linear movement of the nut into a corresponding angular movement of one of said steerable elements.

Considering now more specifically the details of the steering system illustrated in FIG. 11, the system comprises a rotatable steering wheel 1c, a step-up gearing or speed increasing gear mechanism 2c connected directly to the steering wheel 1c and illustrated schematically only, a primary flexible shaft 3c interconnecting a gear train 4c of gears and the steering wheel 1c, two secondary flexible shafts 5c and 6c having one end connected to the gear train 4c, the two shafts forming the output shafts of the gear train and each of them being connected to a reduction gearing 7c and 8c respectively. Each of the reduction gearings 7c and 8c engages a mechanism 9c and 10c, respectively, for changing the direction of a wheel. The two mechanisms 9c and 10c as well as the two reduction gearings 7c and 8c are mutually identical. For this reason the details of the mechanisms and reduction gearings are indicated by identical numbers. The flexible shafts 3c, 5c and 6c comprise a flexible shaft core (not shown) enclosed in a protective flexible casing. The speed increasing gear mechanism 2c as illustrated comprises a planetary gearing consisting of a large gear wheel 2d mounted on the steering wheel shaft 1d which meshes and drives a smaller gear 2e carried by an output shaft 3d to which the inner end of the flexible shaft 3c is secured. Each of the reduction gears 7c and 8c are identical and comprise a smaller gear 7d,8d connected to the terminal ends of the secondary flexible shafts 5c and 6c which mesh and drive larger gears 7e and 8e carried by a rotating shaft 17c forming part of separate actuator mechanisms 9c and 10c for transforming rotary motion to a rectilinear motion. The speed increasing and decreasing ratios of the speed increasing and speed decreasing mechanisms are preferably in the ranges set forth in connection with the steering system previously described to provide an overall speed increasing ratio in the order of that set forth for the previous steering system incorporating speed increasing and speed reduction gear mechanisms.

The steering wheel 1c can be rotated at variable speed, the rotational speed of the flexible shaft 3c being increased by means of the step-up gearing 2c. In the gear train 4c, which in the present embodiment has a gear ratio of 1:1, the rotational speed of the flexible input shaft 3c is transferred to the flexible output shafts 5c and 6c. The gear train 4c comprises two parallel shafts 11c and 12c, acting upon one another through a set of toothed wheels or gears 13c and 14c. The shaft 11c is in connection with the flexible input shaft 3c and shaft 12c is in connection with the flexible output shafts 5c and 6c. The mechanisms 9c and 10c comprise a device for transforming a rotary motion into a rectilinear motion. In the illustrated embodiment, the devices comprise an antifriction linear actuation means such as the screw and nut mechanism 15c, which is connected directly to the reduction gearings 7c and 8c.

In the embodiment illustrated in FIG. 11 each reduction gearing 7c and 8c has a quickly-rotating shaft 16c, to which an end of each flexible shaft 5c and 6c respectively, as fastened, and each reduction gearing 7c and 8c has a slowly rotating shaft 17c. The screw and nut mechanism 15c is provided with an axially movable output rod 18c secured to the nut 20c of the mechanism 15c. The slowly rotating shaft 17c is driveably connected to the screw 19c of mechanism 15c, and the nut 20c is secured against rotation in a transmission housing 21c surrounding mechanism 15c, thus, upon rotation of the screw 19c, the nut 20c travels along the screw, thereby displacing the axially movable rod 18c which telescopically receives the screw 19c. The free end of rod 18c is pivotally connected to one end of a link 22c, the other end of which is secured to a rotary member 23c, so that axial displacement of the rod 18c within the housing 21c causes the rotary member 23c to turn about its axis A.

Figure 12:
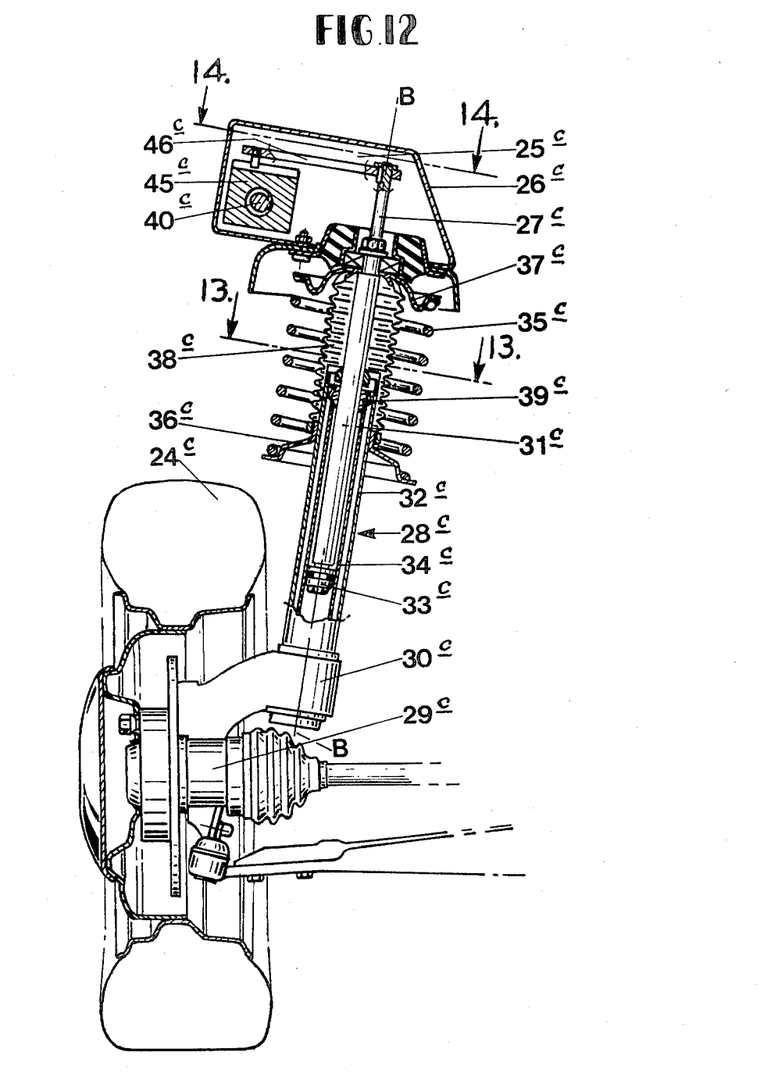
FIG. 12 illustrates a steerable front wheel of a vehicle, mounted on a steering knuckle connected to the steering system.

FIG. 12 illustrates a steerable front wheel 24c of a vehicle which may be steered by the steering system incorporating a transmission mechanism 25c. The transmission mechanism 25c is placed in a housing 26c in the vehicle's chassis, above the wheel 24c and is connected by a rotary shaft 27c to a telescopic shaft assembly 28c. The wheel 24c is mounted on a steering knuckle 30c driven by a shaft passing through the steering knuckle at 29c. The telescopic shaft assembly 28c comprises a shaft 31c and a housing 32c capable of transmitting torque, the shaft 31c being a piston having a piston head 33c slidable in a cylinder 34c. The piston and cylinder assembly 33c, 34c constitutes a shock absorber. In addition, this embodiment comprises a helical compression spring 35c with upper and lower spring seats 36c, 37c, between which a bellows-shaped piston rod shroud 38c is provided.

Figure 13:
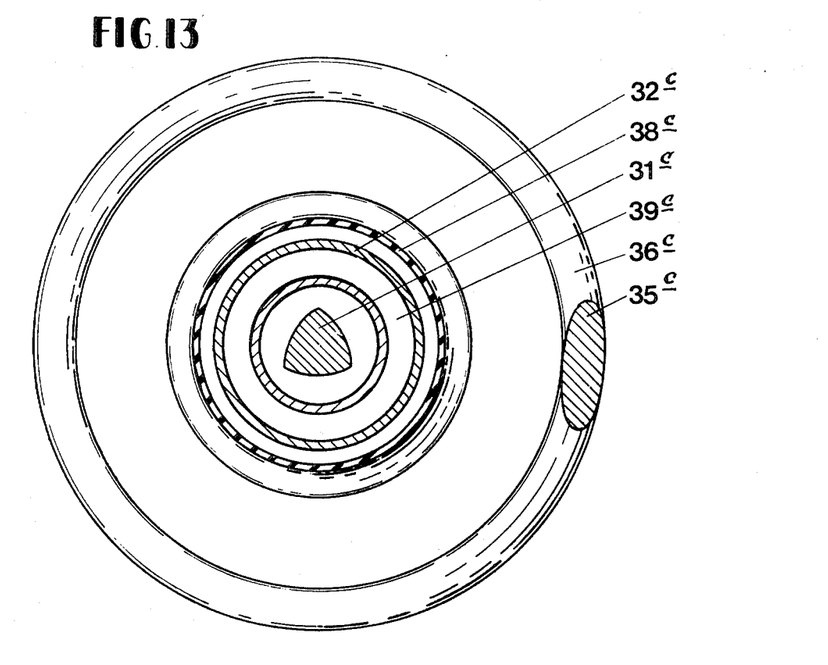
FIG. 13 is a cross-sectional view taken on line 13—13 of FIG. 12.

During the rotation of the shaft 27c, the shaft 31c, which is integral with or connected to shaft 27c, will rotate as well. As best seen in FIG. 13, which is a sectional view taken along line 13—13 of FIG. 12, the cross section of shaft 31c is of basically triangular shape, but has convex sides. An annular partition 39c, the bore of which has a shape complementary to the cross section of the shaft 31c, is fixed to one end of the housing 32c and carries the housing 32c along when the shaft 31c rotates. The other end of the housing 32c is fixed to the steering knuckle 30c, so that the wheel 24c can be steered by rotating the housing 32c around the upright axis B—B. With this structure, the knuckle 30c is capable of moving vertically relative to the step-down gearing 8c while permitting steering torque to be applied to the wheel 24c. In addition, the telescoping shaft assembly provides a shock absorbing function in a minimum of space.

Figure 14:
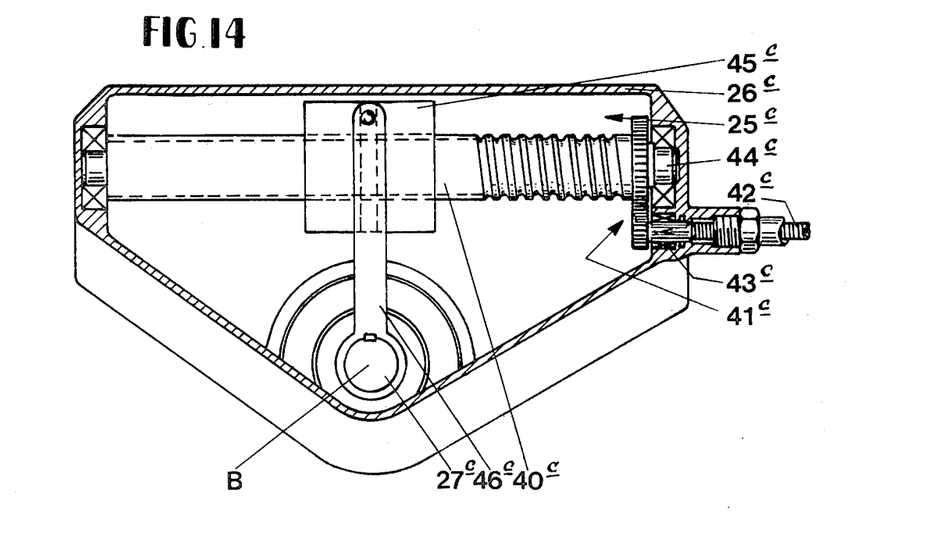
FIG. 14 is a cross-sectional view taken on line 14—14 of FIG. 12.

A modified form of linear actuator or transmission mechanism is illustrated in FIG. 14. In this embodiment a housing 26c contains as transmission mechanism 25c which comprises an antifriction screw and nut mechanism. The screw 40c is driven by a reduction gearing 41c, comprising a rigid input shaft 43c arranged in parallel with the screw 40c and driven by the fast rotating flexible shaft 42c, and additionally a slowly rotating output shaft 44c integral with or drivably connected to the screw 40c. The screw 40c is in engagement with a nut 45c, which is secured against rotation.

The nut 45c is provided with a cam member, such as an external transverse groove, engaging a cam follower, such as a peg projection into a transverse groove. A lever 16c is fixed on the shaft 27c for rotating the same about its axis B—B as the nut 45c is driven back and forth on the screw 40c. The antifriction screw and nut transmission preferably is of the type wherein balls are provided between the screw and the nut.

In view of the foregoing, it should be apparent that a novel steering system has been provided for vehicles having at least two steerable elements, the steering system affording designers wide latitude in the design of such vehicles.

While the preferred embodiments of the present invention have been described in detail, various modifications, additions and changes may be made without departing from the spirit and scope of the present invention as defined in the appended claims.

I claim:

1. In a steering assembly for vehicles, having a movable travel direction adjustment means,
    a steering control system comprising a steering member movable at a variable speed between first and second positions,
    transmission means connecting said steering member to the travel direction adjustment means, whereby movement of said steering member between said positions effects through said transmission means a given displacement of said travel direction adjustment means,
    said transmission means comprising,
    at least one flexible shaft,
    a speed increasing gear mechanism having a speed increasing ratio of about 1:15 and connected between the steering member and one end of said flexible shaft for transforming a steering member input speed, identical to the speed of movement of the steering member, into a higher steering member output speed,
    a speed reduction gear mechanism having a speed reducing ratio of about 1.75:1 and connected to the other end of said flexible shaft for transforming an input speed, identical to said higher steering member output speed, into a lower output speed, means connected between said reduction gear mechanism and said adjustment means for displacing said adjustment means in response to movement of said steering member,
    said speed increasing ratio of said speed increasing gear mechanism being substantially greater than the spped decreasing ratio of said speed decreasing gear mechanism and said ratios together providing an overall speed increasing ratio of at least about 1:8.57 thereby to minimize the torsion effect of said flexible shaft so that the response of said travel direction adjustment accomplishing means to said steering member is relatively direct and there is no feeling of play in the steering member when it is actuated between said first and second positions.

2. In a steering assembly as claimed in claim 1 wherein said movable travel direction adjustment means comprises at least two steerable elements and wherein said flexible shaft includes a primary flexible shaft and a pair of secondary flexible shafts, said primary flexible shaft connected at one end to said speed increasing gear mechanism, an intermediate transfer gear train having an input shaft connected to the other end of the said primary flexible shaft and having at least two output shafts, said reduction gear mechanism connected to each of said steerable elements to displace the same upon actuation and said pair of secondary flexible shafts connecting said gear train output shafts to said speed reduction gear mechanism.

3. In a steering assembly according to claim 2 characterized in that the transfer gear train has a gear ratio of 1:1 between the input shaft and each of the output shafts.

4. In a steering assembly according to claim 3 characterized in that said secondary flexible shafts extending between said gear train output shafts of the transfer gear train are of substantially the same length.

5. In a steering system according to claim 2 including means connected between each steerable element and its associated reduction gear mechanism for converting rotary motion of said reduction gear mechanism to angular motion of said steerable element.

6. In a steering system according to claim 5 wherein said steerable element is pivoted about an axis and said motion converting means includes a screw connected to said reduction gear mechanism, a nut mounted on said screw, means limiting rotation of said screw related to said screw so that rotation of said screw displaces said nut axially thereon, and a lever connecting said nut to said steerable element for pivoting said steerable element about its axis in response to movement of said nut.

7. In a steering system according to claim 6 wherein said rotation limiting means comprises a housing for said nut, said nut including a hollow extension projecting out of said housing and adapted to receive telescopically said screw upon extension and retraction due to rotation of said screw and displacement of said nut axially thereon.

8. In a steering system according to claim 2 wherein each steerable element includes knuckle means pivotable about an upright axis and adapted to mount a wheel for rotation, telescopic shaft means connecting said knuckle means to said reduction gear mechanism in a manner affording both vertical movement of said knuckle means relative to said reduction gear mechanism pivotal movement of said knuckle means in response to actuation of said reduction gear mechanism.

9. A steering system according to claim 8 wherein said telescopic shaft means includes means for absorbing shock imparted to said knuckle means.

10. A steering system according to claim 7 wherein said shock absorbing means includes a torque transmitting housing connected to said knuckle, a cylinder contained within said housing, a piston slidable axially within said cylinder, shaft means operatively connecting said piston to said reduction gear mechanism and means carried by said housing and cooperating with said shaft means to afford axial movement of said shaft means relative to said housing, whereby torque may be transmitted by said shaft means to said knuckle means.

11. A steering system according to claim 8 including chassis means rotatably receiving said telescopic shaft means and means mounting said reduction gear mechanism to said chassis means above said knuckle means.

12. A steering assembly as claimed in claim 1 including at least two flexible shafts subjected to oppositely directed torsional prestresses.

* * * * *